US005921327A

United States Patent [19]

Henriksson et al.

[11] Patent Number: 5,921,327

[45] Date of Patent: Jul. 13, 1999

[54] PNEUMATIC IMPACT TOOL HAVING AN INTEGRALLY FORMED ONE-PIECE HOUSING

[75] Inventors: Stig Roland Henriksson, Nacka; Åke Lennart Nilsson, Enskede, both of Sweden

[73] Assignee: Atlas Copco Berema AB, Nacka, Sweden

[21] Appl. No.: 08/981,593

[22] PCT Filed: Jul. 3, 1996

[86] PCT No.: PCT/SE96/00895

§ 371 Date: Jan. 2, 1998

§ 102(e) Date: Jan. 2, 1998

[87] PCT Pub. No.: WO97/02313

PCT Pub. Date: Jan. 23, 1997

[30] Foreign Application Priority Data

Jul. 6, 1995 [SE] Sweden ................................ 9502457

[51] Int. Cl.[6] ................................................ B23B 45/16

[52] U.S. Cl. ....................... 173/210; 173/162.2; 173/128; 173/170

[58] Field of Search .................................... 173/210, 211, 173/212, 162.2, DIG. 2, 169, 170, 128

[56] References Cited

U.S. PATENT DOCUMENTS

| | | | |
|---|---|---|---|
| 2,558,165 | 6/1951 | Anderson | 173/206 |
| 3,179,185 | 4/1965 | O'Farrell | 173/210 |
| 3,275,089 | 9/1966 | Kaiser | 173/170 |
| 3,847,232 | 11/1974 | Klushin et al. | |
| 4,303,131 | 12/1981 | Clark | 173/168 |
| 4,308,926 | 1/1982 | Montabert | 173/212 |
| 4,576,241 | 3/1986 | Emonet | 173/162.2 |
| 5,056,606 | 10/1991 | Barthomeuf | |
| 5,511,800 | 4/1996 | Drumheller | 173/211 |
| 5,524,715 | 6/1996 | Kimberlin | 173/170 |

FOREIGN PATENT DOCUMENTS

| | | |
|---|---|---|
| 0 150 170 | 7/1985 | European Pat. Off. . |
| 7500518 | 11/1982 | Sweden . |

*Primary Examiner*—Scott A. Smith
*Assistant Examiner*—James P. Calve
*Attorney, Agent, or Firm*—Frishauf, Holtz, Goodman, Langer & Chick

[57] ABSTRACT

A pneumatic portable impact tool includes a tubular housing, at least one handle pivotally supported on the housing, a hammer piston formed with an impact delivering neck portion, and an air distribution valve for directing air pressure alternatingly to opposite ends of the hammer piston so as to make the hammer piston reciprocate in the housing. The housing includes a rear section, an intermediate section, and a front section integrally formed in one piece. The rear section includes a socket portion for supporting the air distribution valve. The intermediate section includes a cylinder bore for sealingly guiding the hammer piston, and a damping sleeve mounted in the cylinder bore and arranged to be penetrated by the hammer piston neck portion, thereby forming a hammer piston damping air cushion chamber. And the front section includes a working implement receiving front opening and supports a movable latch arranged to releasably lock a working implement to the housing. The socket portion of the rear section and the front opening of the front section coaxially extend from the cylinder bore and each have a diameter exceeding a diameter of the cylinder bore, and a lock device is mounted on the rear section to axially retain the air distribution valve and to form a pivot support for the at least one handle.

4 Claims, 3 Drawing Sheets

PNEUMATIC IMPACT TOOL HAVING AN INTEGRALLY FORMED ONE-PIECE HOUSING

This invention relates to a pneumatic impact tool of the type comprising a tubular housing with a rear section, an intermediate section, and a front section, wherein the intermediate section is formed with a cylinder bore in which is reciprocably guided a hammer piston with a forward impact delivering neck portion, a valve means disposed in the rear housing section for distributing motive pressure air to the cylinder bore to reciprocate the hammer piston therein, and a guide sleeve mounted in the cylinder bore for guidingly supporting the rear impact receiving shank portion of a working implement.

BACKGROUND OF THE INVENTION

Tools of the above type are oftenly used for breaking and rock drilling purposes and develop a high impact power to effectively carry out the intended work. However, high impact power also means that the tool housing as well as the components of the impact mechanism are subjected to severe strain during operation, and that the entire tool has to be of a rugged design. This means in turn that the tool tends to be rather large in size and heavy, which is a drawback when used in hand held applications.

Another reason why prior art tools of this kind tend to be rather heavy and bulky is that the housings comprise two or more parts which are held together by heavy duty screw joints, for instance in the form of lateral tie bolts. See SE 424522, EP 150170 and U.S. Pat. No. 2,558,165.

Some common types of prior art impact tools comprise housings in which the cylinder bore has a damping shoulder formed by a decreased diameter portion in the housing. This arrangement requires a rather complicated and costly working of the cylinder bore. An example of such a tool design is shown in EP 150170.

To avoid the above costly working requirement concerning the tool housing it has been previously suggested to form the tool housing with a constant diameter cylinder bore. See U.S. Pat. No. 2,558,165, 3,847,232, and 4,308,926. However, the impact tools shown in these patents still include heavy duty type threaded joints for the assemblage of tool housing parts and for mounting of separate working implement retainers and handles.

OBJECT OF THE INVENTION

It is a primary object of the invention to accomplish a pneumatic impact tool ox the initially mentioned type having a housing of an overall lighter and slimmer design.

Another object of the invention is to accomplish a pneumatic impact tool which comprises a housing of a simplified and less costly design.

Further objects and advantages of the invention will appear from the following detailed specification.

BRIEF DESCRIPTION OF THE DRAWINGS

A preferred embodiment is hereinbelow described in detail with reference to the accompanying drawings.

In the drawings.

DETAILED DESCRIPTION

Figure 1:
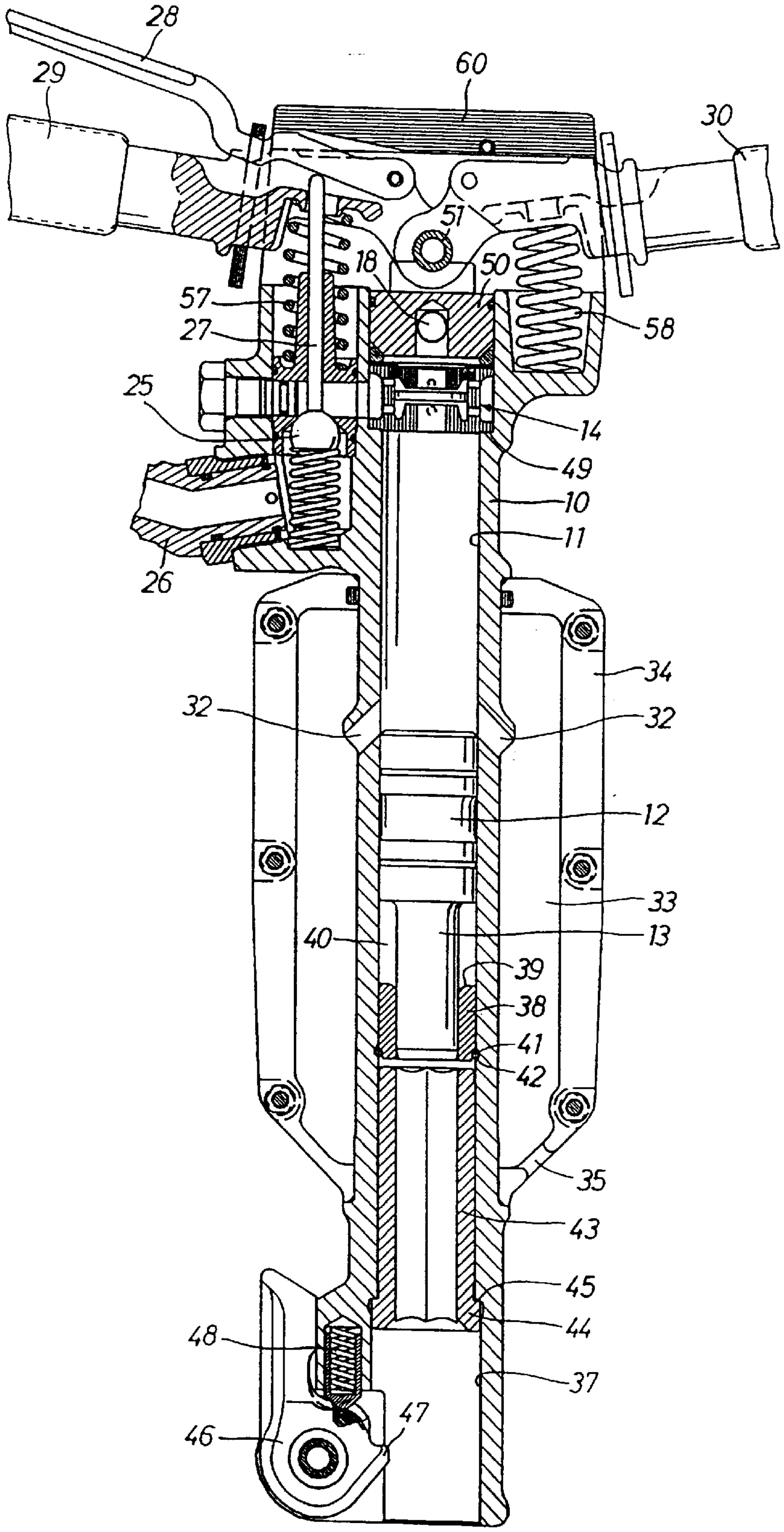
FIG. 1 shows a longitudinal section through an impact tool according to the invention.

The impact tool illustrated in the drawing figures is a pneumatic hand held tool of the breaker type which is intended primarily for demolition work, such as concrete and asphalt breaking and hole making.

The tool comprises a tubular housing 10 with a longitudinal cylinder bore 11 for reciprocably guiding a hammer piston 12. The latter is formed with an impact delivering neck portion 13 for cooperation with the rear impact receiving shank portion of a working implement (not shown).

Figure 2:
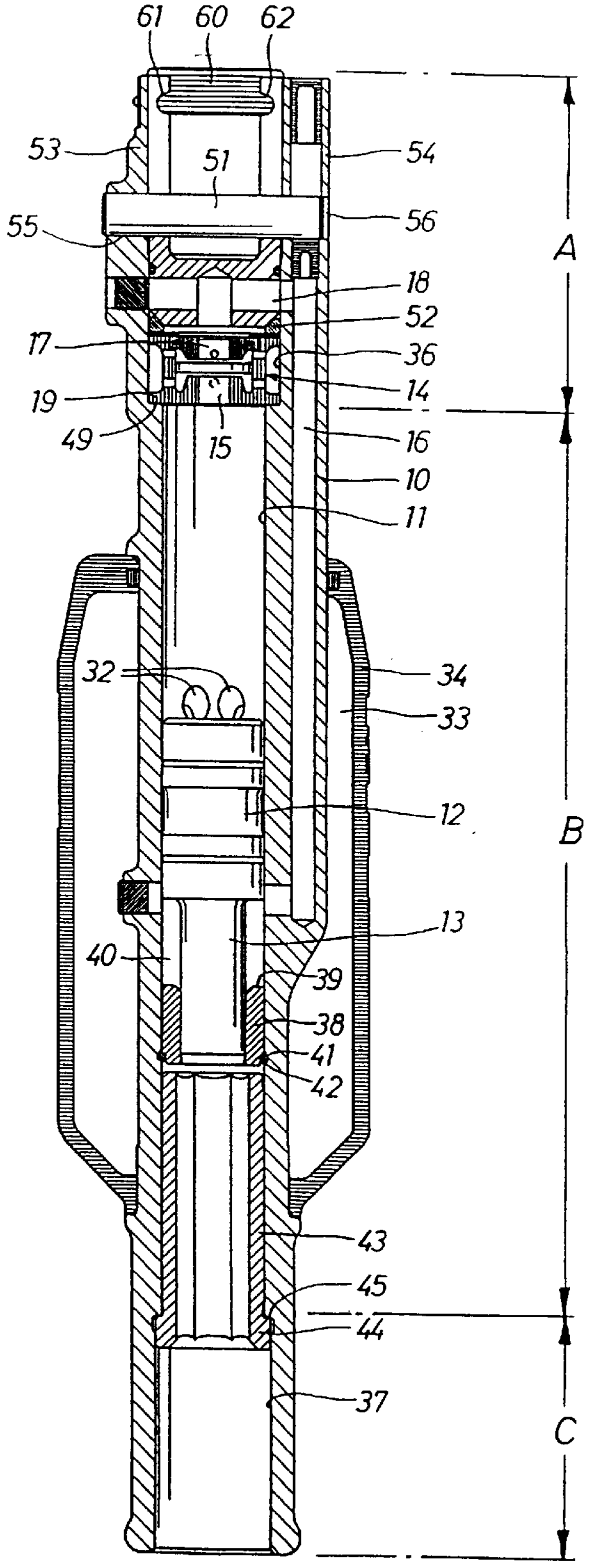
FIG. 2 shows a longitudinal section through the tool in FIG. 1 but referring to a plane perpendicular to the section in FIG. 1.
Figure 3:
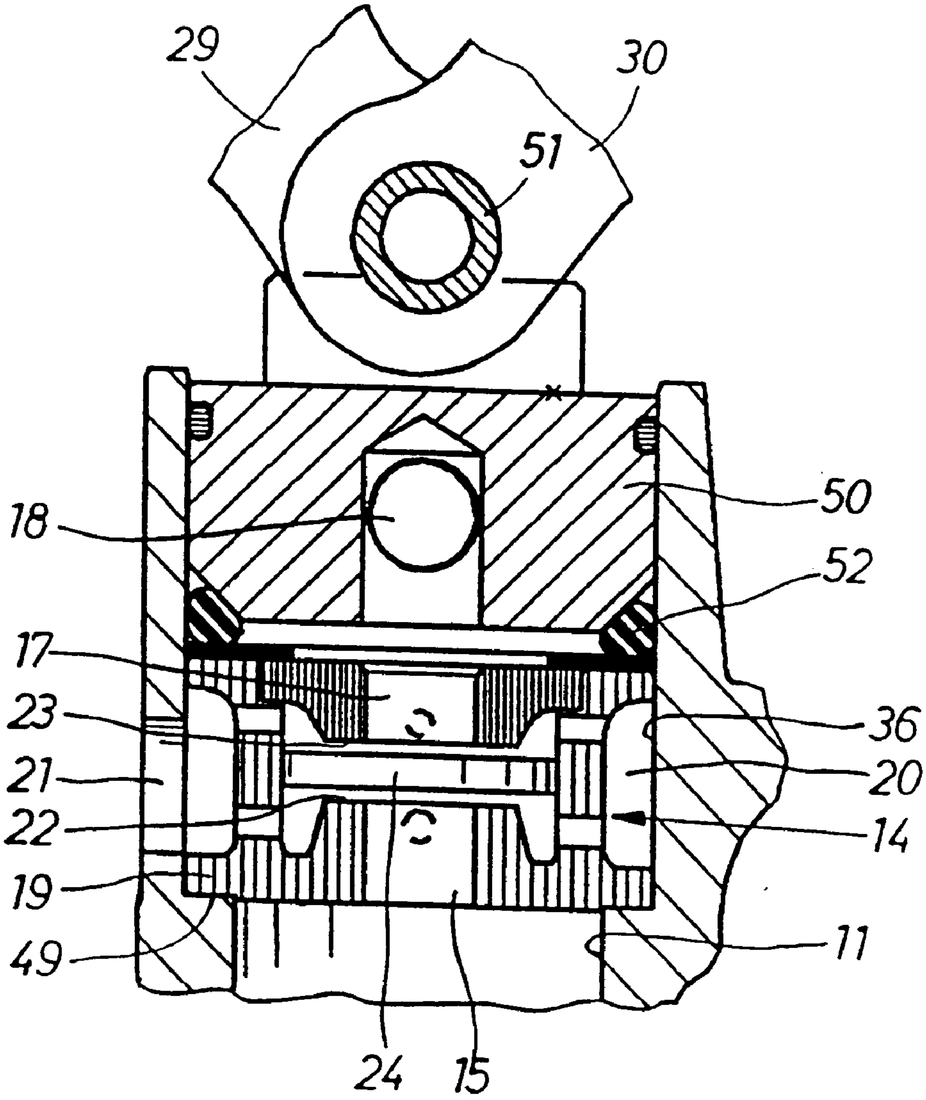
FIG. 3 shows, on a larger scale, a fractional section through the rear part of the tool housing as illustrated in FIG. 1.

At the rear end of the housing 10, there is disposed an air distribution valve 14 which is arranged to feed motive pressure air into the cylinder bore 11 to reciprocate the hammer piston 12 therein. The valve 14 communicates with the rear end of the cylinder bore 11 via a forward directed opening 15 and with a central part of the cylinder bore 11 via a passage 16. The latter extends in parallel with the cylinder bore 11 and is connected to a rear end opening 17 of the valve 14 by means of a transverse passage 18. See FIGS. 2 and 3.

The valve 14 comprises a cylindrical casing 19 formed with a circumferential inlet groove 20 communicating with a radial inlet passage 21. The casing 19 is formed with two oppositely facing annular valve seats 22, 23 which are alternatingly engaged by a flat valve disc 24.

The distribution valve 14 is supplied with pressure air via a ball type throttle valve 25 and the radial inlet passage 21. The throttle valve 25, which communicates with a pressure air source via an inlet connection 26, is operated by a push rod 27 and a lever 28. The latter is pivotally supported on one of two handles 29, 30 which are mounted at the rear end of the tool housing 10.

The housing 10 is provided with outlet openings 32 for draining exhaust air from the cylinder bore 11 at reciprocation of the hammer piston 12. The exhaust air has to pass a silencing chamber 33 formed by a tubular shell 34 of a plastic material surrounding the housing 10. The shell 34 communicates with the atmosphere via an exhaust opening 35. See FIG. 1.

The housing 10 comprises three sections, namely a rear section A, an intermediate section B and a front section C. See FIG. 2. The intermediate section B includes the cylinder bore 11 which has a constant diameter throughout its length. The rear section A comprises an enlarged diameter coaxial continuation 36 of the cylinder bore 11, whereas the front section C comprises an enlarged diameter coaxial extension 37 of the cylinder bore 11.

Within the cylinder bore 11, there is mounted a damping sleeve 38 which at least partly receives the hammer piston neck portion 13 at each impact stroke of the hammer piston 12. The upper annular end surface 39 of the damping sleeve 38 forms together with the cylinder bore 11 and the hammer piston 12 an air cushion damping chamber 40 for protecting the tool from the impact energy at occurring no-load strokes, i.e. when no working implement is fitted or the working implement is lifted off the work piece. The damping sleeve 38 is axially supported in the housing 10 by a lock ring 41 mounted in a circumferential groove 42 in the cylinder bore 11.

In front of the damping sleeve 38, there is mounted a guide sleeve 43. The latter is firmly received in the cylinder bore 11 but is axially supported by a radial flange 44 which engages a shoulder 45 separating the front section enlarged diameter extension 37 from the cylinder bore 11.

The enlarged diameter extension 37 is intended also to receive the collar of a working implement (not shown), and for preventing the working implement from falling out of the tool there is provided a retainer for positive engagement with the working implement collar. The retainer comprises a pivotal latch element 46 with a lock portion 47 and a spring 48 arranged to bias the latch element 46 toward a lock position.

The enlarged diameter continuation 36 of the rear section A forms a mounting socket for the distribution valve 14 wherein the valve casing 19 rests on an annular shoulder 49 separating the enlarged diameter continuation 36 from the cylinder bore 11. See FIG. 3. The valve 14 is axially secured by a plug shaped end closure 50 and a transverse wedge bolt 51. An O-ring 52 accomplishes a resilient retaining force on the valve casing 19 and serves as a seal element around the rear end opening 17 of the valve 14. The end closure 50 comprises the transverse air feed passage 18.

The rearmost part of the rear housing section A comprises two wall portions 53, 54 which are parallel to each other as well as to the cylinder bore 11. The wall portions 53, 54 are spaced relative to each other by a distance substantially equal to the diameter of the cylinder bore continuation 36 and comprise coaxial transverse bores 55, 56 for receiving the wedge bolt 51 which extends perpendicularly to the cylinder bore 11. See FIG. 1.

As described above the transverse wedge bolt 51 serves as a retaining means for the end closure 50 and the distribution valve 14. However, it also serves as a mounting pivot for the handles 29, 30 which are biassed rearwardly by springs 57, 58 in order to obtain vibration insulation of the handles 29, 30 when applying a forward directed force thereon.

A top end cover 60 of a plastic material is secured between the two wall portions 53, 54 by engaging grooves 61, 62.

In operation, the tool is connected to a pressure air source via the inlet connection 26, and a working implement, for example a chisel, is fitted to the tool by introduction of its shank portion into the guide sleeve 43. The working implement is positively locked by interengagement of its collar and the retainer latch 46. (Not illustrated).

By pressing the lever 28, the operator starts feeding pressure air to the distributing valve 14 in which the valve disc 24 alternatingly engages the two opposite valve seats 22, 23 to direct pressure air into the cylinder bore 11 via the passages 18, 16 and the opening 15, thereby reciprocating the hammer piston 12 in the cylinder bore 11. At each forward directed impact stroke, the neck portion 13 of the hammer piston 12 penetrates at least partly into the damping sleeve 38 and hits the rear end surface of the working implement, thereby delivering impact energy to the latter.

Should the shank portion of the working implement not be present in its impact receiving position, due to the tool being lifted off the work piece or the working implement being removed, the hammer piston neck portion 13 would penetrate deeply into the damping sleeve 38. As a result, the air volume entrapped in the annular damping chamber 40 would serve as a cushion means to absorb the kinetic energy of the hammer piston 12 and protect the tool parts from hazardous impact strain.

Pressure air fed into the cylinder bore 11 through the distribution valve 14 is exhausted to the atmosphere via the outlet opening 32, the silencing chamber 33 and the exhaust opening 35.

As apparent from the above description and the drawing figures, the tool according to the invention comprises a very simple, light and inexpensive housing design. A constant diameter cylinder bore 11 provides for a simple through boring and honing process, and by forming the front end section C and working implement retainer support in one piece with the intermediate section B of the housing 10 there is provided for a light and simple housing design. By also forming the rear section A of the housing 10 as a mounting socket for the air distribution valve 14 as well as for the cylinder bore end closure plug 50 and by locking both of them by means of a transverse wedge bolt 51 there is accomplished a very simple impact tool design.

We claim:

1. A pneumatic portable impact tool, comprising:

a tubular housing;

at least one handle pivotally supported on said housing;

a hammer piston formed with an impact delivering neck portion; and an air distribution valve for directing air pressure alternatingly to opposite ends of said hammer piston so as to make said hammer piston reciprocate in said housing;

wherein said housing includes a rear section, an intermediate section, and a front section integrally formed in one piece;

wherein said rear section includes a socket portion for supporting said air distribution valve;

wherein said intermediate section includes a cylinder bore for sealingly guiding said hammer piston, and a damping sleeve mounted in said cylinder bore and arranged to be penetrated by said hammer piston neck portion, thereby forming a hammer piston damping air cushion chamber;

wherein said front section includes a working implement receiving front opening and supports a movable latch arranged to releasably lock a working implement to said housing;

wherein said socket portion of said rear section and said front opening of said front section coaxially extend from said<cylinder bore and each have a diameter exceeding a diameter of said cylinder bore; and wherein a lock device is mounted on said rear section to axially retain said air distribution valve and to form a pivot support for said at least one handle.

2. The impact tool according to claim 1, wherein:

said lock device comprises a wedge bolt mounted transversely through said rear section; and said at least one handle comprises two oppositely directed handles both pivotally supported on said wedge bolt.

3. The impact tool according to claim 2, further comprising a working implement guiding sleeve mounted in said cylinder bore forwardly of said damping sleeve.

4. The impact tool according to claim 1, further comprising a working implement guiding sleeve mounted in said cylinder bore forwardly of said damping sleeve.

* * * * *